United States Patent [19]
Yabu

[11] 3,890,640
[45] June 17, 1975

[54] STEP DRIVEN MAGNETIC RECORDING AND REPRODUCING APPARATUS

[75] Inventor: Toshiomi Yabu, Kyoto, Japan

[73] Assignee: Matsushita Electric Industrial Co., Ltd., Kadoma, Japan

[22] Filed: Oct. 29, 1973

[21] Appl. No.: 410,563

Related U.S. Application Data

[63] Continuation of Ser. No. 102,022, Dec. 28, 1970, abandoned.

[30] Foreign Application Priority Data

Dec. 30, 1969 Japan .................................. 45-1715

[52] U.S. Cl. ...................... 360/50; 360/35; 360/51; 360/54

[51] Int. Cl. ........................................... G11b 15/00

[58] Field of Search .................... 360/50, 51, 54, 35

[56] References Cited

UNITED STATES PATENTS 3,395,248 7/1968 Suzuki et al. .................... 178/6.6 FS
3,639,688 2/1972 Nelson .............................. 178/6.6 P
R26,867 4/1970 Edwards et al. ....................... 360/51

*Primary Examiner*—Stuart N. Hecker
*Attorney, Agent, or Firm*—Stevens, Davis, Miller & Mosher

[57] ABSTRACT

A magnetic recording and reproducing apparatus of the type in which a magnetic tape is steppingly driven by a driving system for recording information intermittently, having a first and a second head spaced from each other by a distance equal to the pitch of the steppingly advancing movement of the magnetic tape. The second head reproduces the control signal previously recorded by the first head so as to control the tap driving system by the reproduced signal. An information signal is recorded on the magnetic tape with the timing of the reproduced signal, while at the same time, the reproduced signal is recorded on the magnetic tape by the first head so that the information signal can be successively recorded in a uniformly pitched relationship.

2 Claims, 11 Drawing Figures

FIG. 1
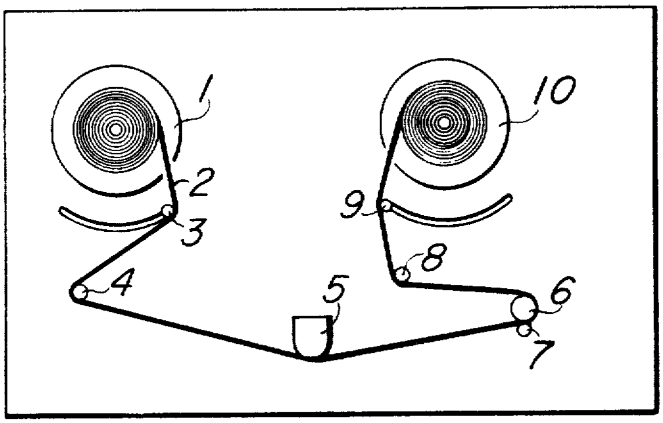
FIG. 2 FIG. 3
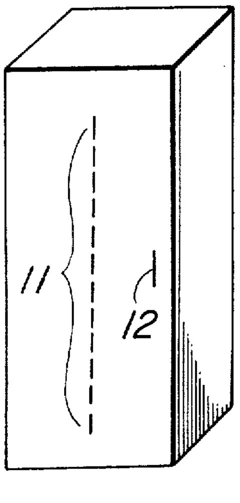
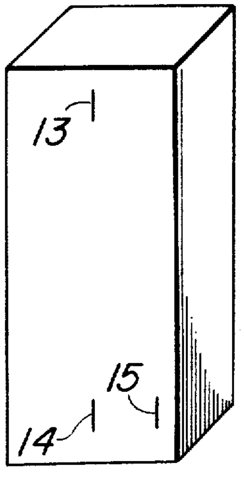
T. YABU
INVENTOR
BY Stevens, Davis, Miller & Mosher
ATTORNEYS

INVENTOR

BY

ATTORNEY

INVENTOR

BY

ATTORNEY

STEP DRIVEN MAGNETIC RECORDING AND REPRODUCING APPARATUS

This is a continuation of application Ser. No. 102,022, filed 12-28-70 now abandoned.

This invention relates to magnetic recording and reproducing apparatus of the type in which a recording medium such as a magnetic tape is steppingly driven and an information signal is intermittently recorded on the magnetic tape during the stepping movement of the magnetic tape.

Prior art magnetic recording and reproducing apparatus of this kind have employed means such as a stepping motor, a ratchet mechanism, geneva gears or d.c. servo-motor for steppingly driving a magnetic tape. However, the prior art magnetic recording and reproducing apparatus employing such tape driving means have been defective in that a slip occurs inevitably between the magnetic tape and tape engaging and transporting means including a capstan and a pinch roller, the accuracy of the tape transporting pitch is subject to limitation and the recording of an information signal at constant intervals is quite difficult.

It is therefore an object of the present invention to provide a novel and improved magnetic recording and reproducing apparatus capable of recording an information signal on a magnetic tape with a constant pitch irrespective of possible fluctuation in the pitch with which the magnetic tape is mechanically steppingly driven.

Another object of the present invention is to provide a magnetic video recording and reproducing apparatus of rotary head type in which an information signal can be recorded on a magnetic tape as successive tracks of record of equal intervals at a fixed angle with respect to the travelling direction of the magnetic tape.

According to the present invention, the delay time of a delay circuit, described later, may be suitably selected so as to exactly stop a magnetic tape at a position between successive pulses of a control signal. When, therefore, a steppingly driving system including such a delay circuit is applied to a magnetic video recording and reproducing apparatus of rotary head type, the continuously rotating video head engages a magnetic tape at a position which differs from the position of the track recorded with the signal so that undesirable drop-out and head clogging can be eliminated.

Further, the apparatus according to the present invention employs a magnetic head having a first and a second head gap so that a signal recorded by the first head gap can be reproduced by the second head gap, and simultaneously with the reproduction, the signal can be recorded by the first head gap again. Because of such an arrangement, one pitch of the steppingly recorded signal is dependent upon the mechanical distance between the first and second head gaps. This is advantageous in that the pitch of the steppingly recorded signal has very high precision, strict precision is not required for the driving mechanism for steppingly driving the magnetic tape, and the magnetic tape may merely be fed without any unnecessary precaution.

Other objects, features and advantages of the present invention will be apparent from the following detailed description taken in conjunction with the accompanying drawings, in which:

FIG. 1 is a schematic top plan view of a tape transporting system in a magnetic recording and reproducing apparatus of steppingly driving type to which the present invention is applied;

FIG. 2 is an enlarged perspective view of a multihead having a plurality of head gaps preferably used in the present invention;

FIG. 3 is an enlarged perspective view of a combination audio and control head preferably used in the present invention;

Figure 4:
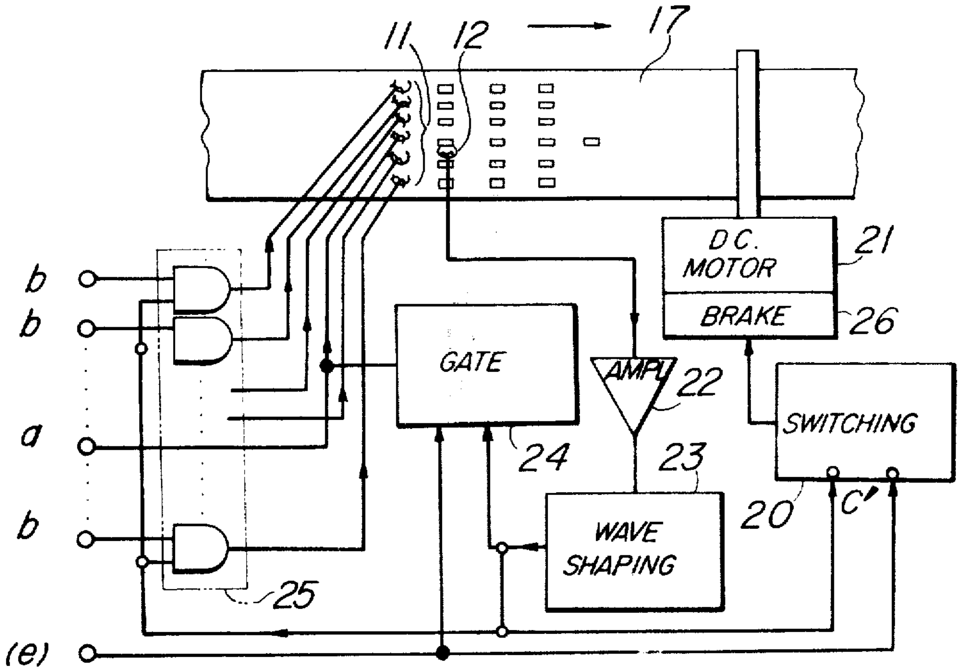
FIG. 4 is a block diagram of a steppingly driving system in a magnetic recording and reproducing apparatus of multihead type according to the present invention.

Referring to FIG. 1 showing a magnetic recording and reproducing apparatus of steppingly driving type to which the present invention is applied, a magnetic tape 2 wound around a supply reel 1 is fed past a first tensioning arm 3, a first guide post 4 and the gap surface of a magnetic head 5 into the nip of a capstan 6 and a pinch roller 7 to be steppingly driven thereby. The magnetic tape 2 is then fed past a second guide post 8 and a second tensioning arm 9 to be taken up on a take-up reel 10. The magnetic tape 2 is steppingly driven by the combination of the capstan 6 and the pinch roller 7. A stepping motor, a ratchet mechanism or a d.c. motor is generally connected to the capstan shaft to cause the capstan to intermittently rotate through a fixed angle thereby to steppingly drive the magnetic tape 2. However, a slip occurs inevitably between the magnetic tape 2 and the capstan 6 and the pinch roller 7 depending on the value of relative friction therebetween.

FIG. 2 is an enlarged perspective view of a multihead having a plurality of head gaps 11 which is preferably employed in a steppingly driving system according to the present invention and is similar to that frequently employed in prior art apparatus for recording a binary coded information signal on a magnetic tape. The multihead employed in the steppingly driving system according to the present invention is featured by the fact that it is provided with a second head gap 12 in addition to the first head gaps 11 arranged in a row and the second head gap 12 is spaced from the row of the first head gaps 11 by a distance which corresponds to one advancing stroke of a magnetic tape during its stepping movement.

FIG. 3 is an enlarged perspective view of a combined audio and control head which is preferably employed in a magnetic video recording and reproducing apparatus of rotary head type equipped with steppingly driving means. The audio and control head preferably employed in the present invention is provided with a second head gap 15 in addition to an audio recording and reproducing head gap 13 and a control signal recording and reproducing head gap or first head gap 14 which have been provided heretofore. The second head gap 15 is spaced from the first head gap 14 by a distance which is equal to one advancing stroke of a magnetic tape during its stepping movement. The one advancing stroke $l$ of a magnetic tape may be selected so as to give the relation.

$$l = V_T/V_S \quad (1)$$

where $V_S$ is the frequency of the vertical synchronizing signal in a standard television signal and $V_T$ is the speed of the magnetic tape when the magnetic tape is run at a constant speed. By selecting $l$ to satisfy the relation given by the equation (1), a picture of good quality can be reproduced even when the reproduction is carried out at a constant speed.

Referring now to FIGS. 4 to 7, the basic principle of the stepping driving for a magnetic tape will be described.

At first, a steppingly driving system for use in a magnetic recording and reproducing apparatus employing a multihead having a plurality of head gaps arranged in a vertical row for the recording and reproduction of a binary coded signal will be described with reference to FIG. 4.

Referring to FIG. 4, a multihead having a row of first head gaps 11 and a second head gap 12 as shown in FIG. 2 is fixedly disposed relative to a magnetic tape 17. A start signal is applied to a terminal *a* while the magnetic tape 17 is at rest so as to record the start signal on the magnetic tape 17 by one of the first head gaps 11 which is disposed opposite to the second head gap 12. Subsequently, data of fixed pulse width are applied to terminals *b*, thence to a group of AND gates 25, and at the same time, a clock signal is applied to a terminal (*e*). In response to the application of the clock signal to the terminal (e), a switching circuit 20 is actuated so that voltage is applied to a d.c. motor 21 to drive the capstan and the magnetic tape 17 is moved in a direction of the arrow.

When the portion of the magnetic tape 17 having been recorded with the start signal reaches the second head gap 12 as the magnetic tape 17 is advanced, the second head gap 12 reproduces the signal which is then subject to amplification by a reproducing amplifier 22, wave shaping by a wave shaping circuit 23 and amplification by a recording gate 24. The signal is subsequently recorded on the magnetic tape 17 by the first head gap 11 which is disposed at the position corresponding to the second head gap 12. Simultaneously with the above operation, the input information applied to the AND gates 25 through the input terminals *b* appears from the gates 25 in response to the output from the wave shaping circuit 23 so that the input information is recorded on the magnetic tape 17. The output from the wave shaping circuit 23 is applied also to a terminal C′ of the switching circuit 20 as a stop signal so as to turn off the switching circuit 20 upon completion of the recording thereby to stop the d.c. motor 21 connected to the capstan shaft. In response to the subsequent application of input information and the clock signal to the terminals *b* and (e) respectively, the switching circuit 20 is turned on again to drive the d.c. motor 21 connected to the capstan shaft thereby to advance the magnetic tape 17 in the direction of the arrow again. At the time at which the previously recorded signal is reproduced by the second head gap 12, the first head gap group 11 records the data of input information on the magnetic tape 17. The output from the wave shaping circuit 23 is applied to the terminal C′ of the switching circuit 20 with the same timing as the recording timing to turn off the switching circuit 20 thereby to stop the rotation of the d.c. motor 21 connected to the capstan shaft and to stop the travelling movement of the magnetic tape 17. The above operation is sequentially repeated to record the input information on the magnetic tape 17. It will be thus seen that the magnetic tape 17 advances just like a measuring worm does.

It may happen that the magnetic tape 17 is advanced beyond the distance corresponding to the spacing between the first and second gaps of the magnetic head due to, for example, the inertia of the d.c. motor 21 connected to the capstan shaft. In order to eliminate such mal-operation, it is preferable that the d.c. motor 21 is provided with a built-in or external electromagnetic brake 26 or any other suitable brake means. In the multihead provided with a plurality of first head gaps arranged in a vertical row and a single second head gap as described above, the channel (track) related with the second head gap may be utilized as a clock channel (track) so as to eliminate the need for any separate clock channel (track).

Figure 5:
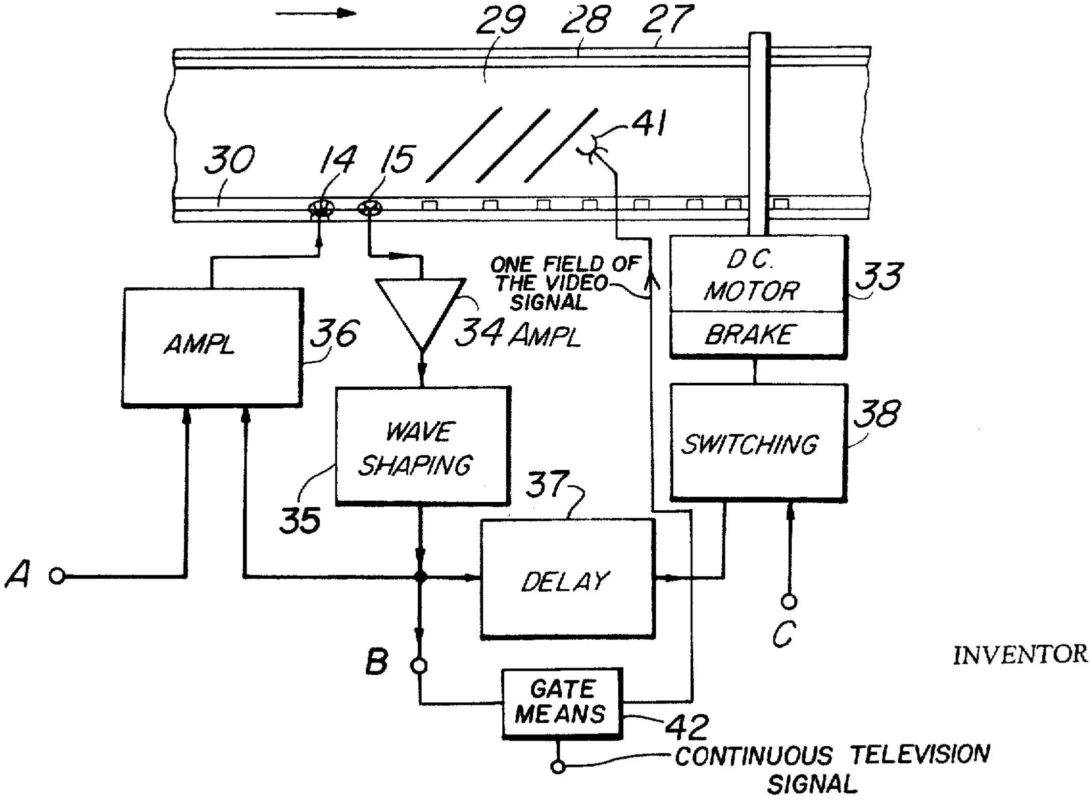
FIG. 5 is a block diagram of a steppingly driving system in a magnetic video recording and reproducing apparatus of rotary head type according to the present invention.

A steppingly driving system for use in a magnetic video recording and reproducing apparatus of rotary head type will be described with reference to FIG. 5. Referring to FIG. 5, an audio track 28, video tracks 29 and a control track 30 are formed on a magnetic tape 27. The audio track 28 and the control track 30 are recorded by a magnetic head of the kind shown in FIG. 3, while the video tracks 29 are recorded at an angle relative to the longitudinal direction of the magnetic tape 27 by a rotary head 41 which is rotated at a constant speed.

At first, a start signal is applied to a terminal A to cause a pulse current to flow across the first head gap 14 of the control signal recording magnetic head thereby to record the signal on the magnetic tape 27. In response to the subsequent application of a steppingly driving signal to a terminal C, a switching circuit 38 is actuated to drive a d.c. motor 33 provided with brake means so that the magnetic tape 27 is moved in a direction of the arrow. The signal previously recorded on the magnetic tape 27 by the first head gap 14 is reproduced by the second head gap 15, and after amplification by a reproducing amplifier 34 and wave shaping by a wave shaping circuit 35, the signal is applied through a recording amplifier 36 to the first head gap 14 which records the control signal on the magnetic tape 27. The output from the wave shaping circuit 35 appears also at a terminal B and is applied to gate means 42 to gate a video signal applied to the rotary head with the same timing as the timing of the signal reproduced by the second head gap 15, thereby to record one field on the magnetic tape 27. The output from the wave shaping circuit 35 connected to the second head gap 15 is further applied to a delay circuit 37 having a predetermined delay time. The signal thus delayed is applied to the switching circuit 38 to turn off the latter thereby to stop the rotation of the d.c. motor 33 connected to the capstan shaft. The above operation is sequentially repeated in response to the subsequent application of the driving signal to the terminal C.

One field of the video signal can be derived on the basis of the signal appearing at the terminal B. More precisely, the output signal appearing at the terminal B may be used to trigger a monostable multivibrator which delivers a pulse output having a pulse width slightly less than a period corresponding to two fields. The pulse output from the multivibrator may be used to gate the continuous portions of the vertical synchronizing signal separated from the video signal to be recorded so as thereby to derive the two consecutive portions of the vertical synchronizing signal. The two consecutive portions of the vertical synchronizing signal may be used to trigger a flip-flop, and the output from the flip-flop may be used to gate the video signal to derive one field of the video signal.

Figure 6:
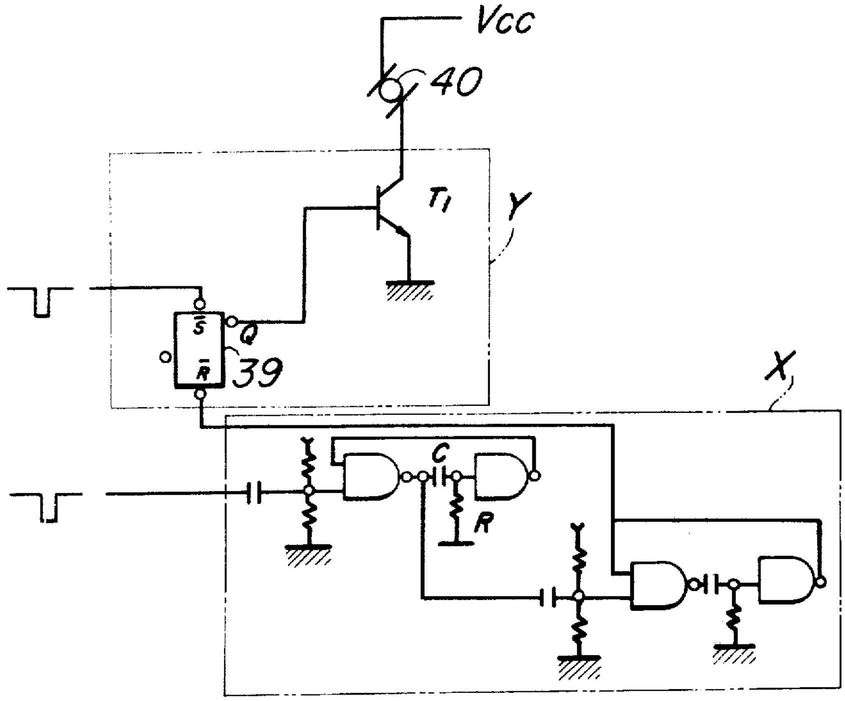
FIG. 6 is an electrical circuit diagram of the steppingly driving system according to the present invention.
Figure 7A:
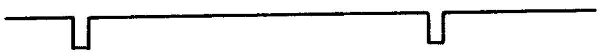
FIGS. 7*a* to 7*e* show the operating timing of the electrical circuit shown in FIG. 6.
Figure 7B:
Figure 7C:
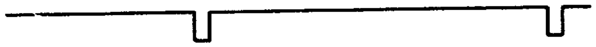
Figure 7D:
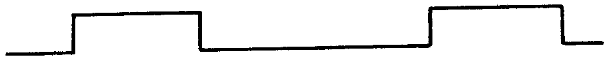
Figure 7E:

Referring to FIG. 6, a delay circuit X comprising logic elements, a capacitance C and a resistance R (= 470 ohms) has a delay time $\tau$ which is given by $\tau = 400$ C sec. (using a TTL . IC) The delay time $\tau$ may be so determined that the travelling distance D of a magnetic tape driven by the d.c. motor 33 or 21 is approximately given by $$D = l/2 \qquad (2)$$

where l is the spacing between the first and the second head gap. However, the distance D which falls within the range satisfying an inequality $D<l$ is acceptable in practical use.

A switching circuit Y in FIG. 6 comprises an Reset-Setup flip-flop 39 and a switching transistor $T_1$. In response to the application of a setting signal or start signal to an input terminal $\bar{S}$, an output voltage appears at an output terminal Q to urge the transistor $T_1$ to conduct so that current is supplied from $V_{cc}$ to a d.c. motor 40 to drive the latter. On the other hand, in response to the application of a resetting signal or stop signal to an input terminal $\bar{R}$ through the delay circuit X, no voltage appears at the output terminal Q of the R – S flip-flop 39 to cut off the transistor $T_1$ so that the current supplied to the d.c. motor 40 is cut off to stop the rotation of the d.c. motor 40.

FIGS. 7*a* to 7*e* show the operating timing of the electrical circuit shown in FIG. 6. More precisely, FIGS. 7*a* to 7*e* show the waveform of the start signal, the waveform of the stop signal obtained by shaping the waveform of the signal reproduced by the second head gap 15, the waveform of the output signal of the delay circuit for cutting off the current supplied to the d.c. motor, the waveform of the current flowing through the d.c. motor, and the waveform of the current flowing across the first head gap 14.

What is claimed is:

1. A magnetic recording and reproducing apparatus for the recording of information during incremental non-continuous motion of a magnetic recording medium, comprising a first head gap disposed at a fixed position relative to said magnetic recording medium, a second head gap disposed at a fixed position along the track of and spaced from said first head gap in the travelling direction of said magnetic recording medium, means for driving said magnetic recording medium, means for energizing said magnetic recording medium driving means in response to the application of a start signal to cause the travelling movement of said magnetic recording medium so that said second head gap reproduces a control signal previously recorded on said magnetic recording medium by said first head gap, means for deenergizing said magnetic recording medium driving means in response to said reproduced control signal thereby to stop the travelling movement of said magnetic recording medium, said deenergizing means including delay means for delaying the reproduced control signal to delay the deenergizing of said driving means for a predetermined period of time, means for gating at least one field of an input video signal in response to said reproduced control signal, means for applying said at least one field of the video signal gated by said gating means to a rotary head for recording it on said magnetic recording medium on a track which makes an angle with respect to the travelling direction of said magnetic recording medium, and means for applying the reproduced control signal to said first head gap to record a succeeding control signal on said magnetic recording medium at the same time that said at least one field of the video input signal is applied to said rotary head.

2. A magnetic recording and reproducing apparatus for the recording of information during incremental non-continuous motion of a magnetic recording medium, comprising a first head gap disposed at a fixed position relative to said magnetic recording medium, a second head gap disposed at a fixed position along the track of and spaced from said first head gap in the travelling direction of said magnetic recording medium, means for driving said magnetic recording medium, means for energizing said magnetic recording medium driving means in response to the application of a start signal to cause the travelling movement of said magnetic recording medium so that said second head gap reproduces a control signal previously recorded on said magnetic recording medium by said first head gap, means for deenergizing said magnetic recording medium driving means in response to said reproduced control signal thereby to stop the travelling movement of said magnetic recording medium, means for gating at least one field of an input video signal in response to said reproduced control signal, means for applying said at least one field of the video signal gated by said gating means to a rotary head for recording it on said magnetic recording medium on a track which makes an angle with respect to the travelling direction of said magnetic recording medium, and means for applying the reproduced control signal to said first head gap to record a succeeding control signal on said magnetic recording medium at the same time that said at least one field of the video input signal is applied to said rotary head, in which the spacing between said first head gap and said second head gap is a linear function of the travelling speed of said magnetic recording medium during reproduction when it is run at a constant speed and the frequency of the vertical synchronizing signal in the video signal.

* * * * *